United States Patent [19]

Kramer

[11] Patent Number: 5,090,779
[45] Date of Patent: Feb. 25, 1992

[54] ACOUSTIC SIGNAL TRANSMISSION BETWEEN A TRACTOR AND TRAILER WITHIN THE AIR BRAKE SYSTEM

[75] Inventor: Dennis A. Kramer, Troy, Mich.

[73] Assignee: Rockwell International Corporation, Pittsburgh, Pa.

[21] Appl. No.: 573,938

[22] Filed: Aug. 27, 1990

[51] Int. Cl.⁵ .................... B60T 8/88; H04R 17/00
[52] U.S. Cl. ............................................ 303/7; 303/92; 188/1.11; 381/154
[58] Field of Search ............... 188/1.11; 303/7, 20, 303/86, 91, 92; 381/154

[56] References Cited

U.S. PATENT DOCUMENTS 4,565,258  1/1986  Butler et al. .................. 381/154 X
4,917,443  4/1990  Kramer et al. ..................... 303/92

FOREIGN PATENT DOCUMENTS 2124853  2/1984  United Kingdom ............... 381/154

Primary Examiner—Robert J. Oberleitner
Assistant Examiner—Alfred Muratori

[57] ABSTRACT

A technique for acoustically communicating through existing air brake lines between a tractor and a trailer. The diagnostic status of the trailer antilock system is communicated via acoustic signals from the trailer antilock system through the air brake lines of the trailer and into the tractor air brake line. A piezo crystal located in the tractor air brake line converts the acoustic signal into an electrical signal which may be used to illuminate a lamp providing a display on the tractor dashboard.

11 Claims, 4 Drawing Sheets

5,090,779

ACOUSTIC SIGNAL TRANSMISSION BETWEEN A TRACTOR AND TRAILER WITHIN THE AIR BRAKE SYSTEM

FIELD OF THE INVENTION

The present invention relates to communication along fluid lines by means of acoustic signals and more particularly to techniques for communicating the diagnostic status of trailer mounted equipment from the trailer to the respective tractor.

BACKGROUND OF THE INVENTION

Interconnection between a tractor and a trailer typically includes a wiring harness having a multi-pin electrical connection plus gladhand connections for the air brake command and air brake supply lines. Any electrical signals which are communicated from the tractor to the trailer pass via the wiring harness. Due to the limited number of wires present in an existing wiring harness and the dedicated purpose therefore, any additional electrical equipment added to a trailer requires additional wiring. Therefore it is apparent that the limitations of the existing wiring harness make it difficult to expand the number of signals which can be communicated between the tractor and trailer. For example, one limitation in the present system is techniques to communicate the diagnostic status of the trailer antilock system from the trailer to the tractor. This communication is accomplished presently by illuminating a lamp located on the trailer in view of the tractor rear view mirror when the brakes are applied. In this manner, the tractor operator is continuously informed of the diagnostic status of the trailer antilock system. It is, however, a benefit to receive and display this information on the tractor dashboard.

SUMMARY OF THE INVENTION

The present invention incorporates a technique for acoustically communicating through existing air brake lines between a tractor and a trailer. In the preferred embodiment, the diagnostic status of the trailer antilock system is communicated via acoustic signals from the trailer antilock system through the air brake lines of the trailer and into the tractor air brake line. A piezo crystal located in the tractor air brake line converts the acoustic signal into an electrical signal which may be used to illuminate a lamp providing a display on the tractor dashboard.

The preferred embodiment of the present invention includes an apparatus for communicating trailer antilock system diagnostic status to a tractor operator through an existing air brake line including means for generating and transmitting an acoustic signal in the air brake line of the trailer in response to a predefined diagnostic condition in the antilock system as well as means for receiving the acoustic signal located in the same air line on the tractor which then displays receipt of the signal in direct view of the tractor operator. Another contemplated embodiment of the present invention includes an antilock brake system for a tractor-trailer which includes a microprocessor for controlling the antilock function of the trailer, a relay valve for modulating trailer brake force in response to control of the microprocessor, a diagnostic means for producing a signal in response to verification of preselected performance parameters of the microprocessor, means for generating an acoustic signal in the air brake line in the trailer in response to lack of verification of preselected performance parameters, means for receiving the acoustic signal in the air brake line of the tractor and means for displaying receipt of the acoustic signal in direct view of the vehicle operator. Another contemplated embodiment of the present invention includes an apparatus for communicating trailer antilock system status to a tractor through existing air brake lines the apparatus comprising a voltage frequency convertor for providing a frequency signal in response to a preselected trailer antilock system status, a first piezo crystal located in the air brake line of the tractor and connected to the frequency convertor, a second piezo crystal located in the air brake line of the tractor, a frequency to voltage convertor connected to the second piezo crystal and a warning indicator connected to the voltage convertor and positioned to provide notification of trailer antilock system status to the tractor operator.

These and other aspects of the present invention will become more readily apparent by reference to the following detailed description of the embodiments as shown in the drawings.

DESCRIPTION OF THE PREFERRED EMBODIMENT

Figure 1:
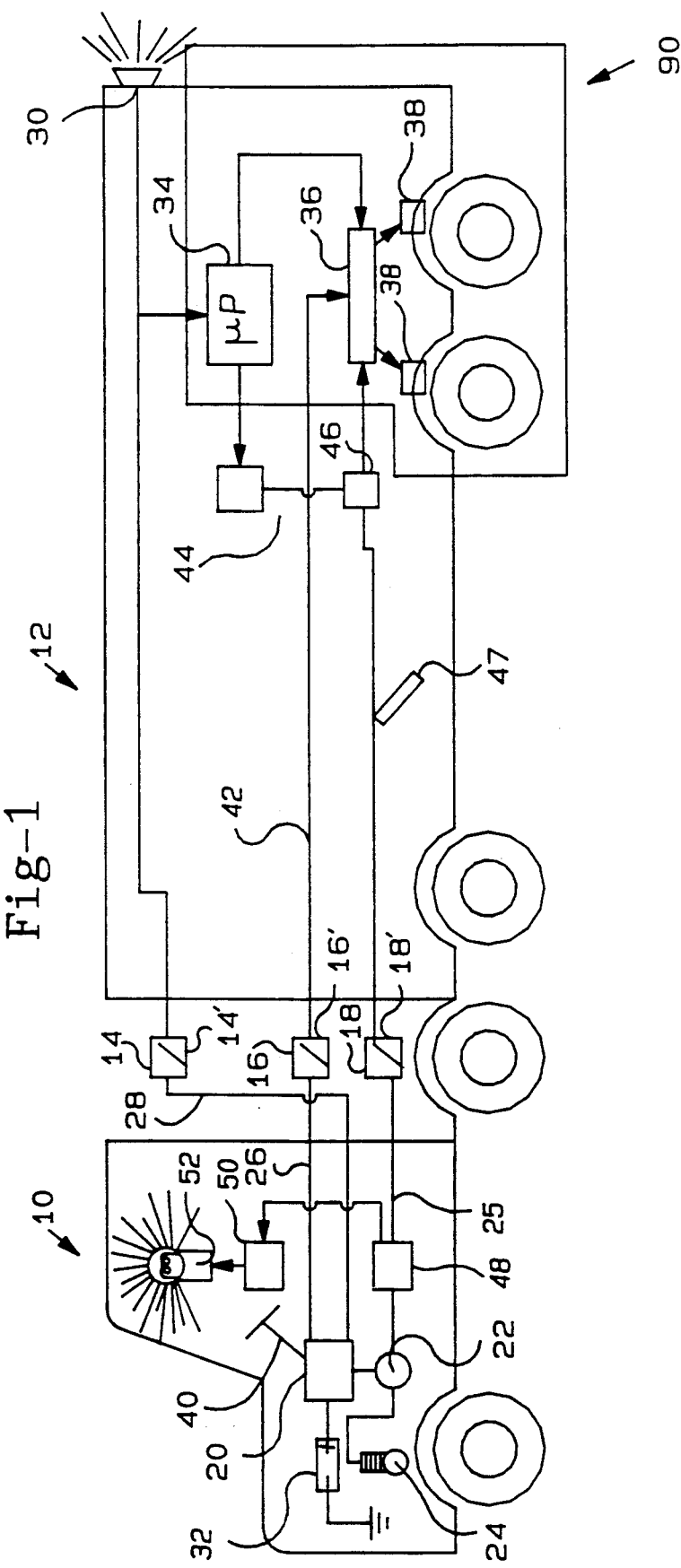
FIG. 1 is a schematic diagram of the preferred embodiment of the present invention showing components in respective positions located about a tractor-trailer.

The preferred embodiment of the present invention as shown in FIG. 1 includes a tractor 10 and trailer 12. Connections between the tractor 10 and trailer 12 include seven pin electrical connections 14, 14', air brake supply line gladhands 16, 16' and air brake command line gladhands 18, 18'. Tractor 10 includes a treadle valve 20 which controls release of compressed air (supplied to reservoir 22 by compressor 24) into air brake command line 26. Treadle valve 20 includes an electrical switch (not shown) which supplies electrical power to brake light 30 from battery 32 upon depression of foot pedal 40 associated with treadle valve 20.

Figure 2:
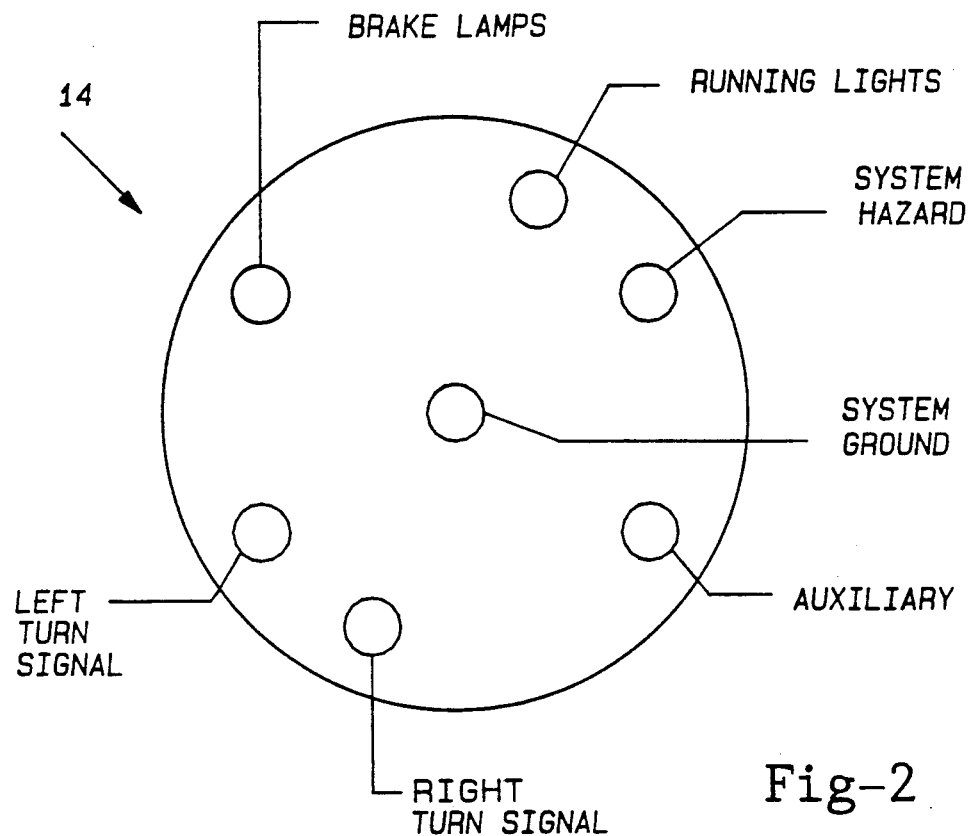
FIG. 2 is a layout of the conductors of a conventional wiring harness as arranged on the connector of a conventional wiring harness.

FIG. 2 illustrates the arrangement of specific conductors on connector 14. A mirror image arrangement of conductors is provided on connector 14' (not shown). As indicated by appropriate labeling, conductors include; system ground, running lights, brake lamps, right turn signal, left turn signal, hazard signals and auxiliary. The auxiliary may be used for an interior light, a refrigeration unit, etc. The addition of any new equipment requiring electrical power supply or electrical communication between the tractor and the trailer cannot be accommodated by the existing wiring harness. For example, retrofit of existing trailers with antilock systems requires the addition of a power supply conductor to the wiring harness from tractor to trailer. An optional technique is to tap into the stop light circuit and energize the antilock system only during application of brakes.

The trailer antilock system shown in FIG. 1 performs a conventional antilock control function, that is; air pressure supplied via air brake command line 25 controls the volume of compressed air released by relay valve 36 from air brake supply line 42. This controls the pressure in air brake chamber 38 which establishes the brake force applied to the respective vehicle wheels. Microprocessor 34 modulates the air pressure in air brake command line 25. In the preferred embodiment of the present invention, the electrical power for the trailer antilock microprocessor 34 is drawn from the brake lamp conductor. Such a system is described in U.S. Pat. No. 4,917,443 herein incorporated by reference. Diagnostic transmitter 44 receives diagnostic status information from microprocessor 34 and produces a 2500 Hz electrical frequency signal upon receiving indication of a faulty status. The 2500 Hz signal is then converted to an acoustical signal by piezo crystal 46 located in air brake command line 25. The 2500 Hz acoustic signal is then communicated to tractor 10 via air brake command line 25. Diagnostic receiver 48 produces a 2500 Hz electrical frequency signal upon receiving the 2500 Hz acoustic signal from transmitter 46. Discriminator 50 then selects from the multitude of signals incident on receiver 48 and produces a voltage signal which illuminates lamp 52.

Figure 4:
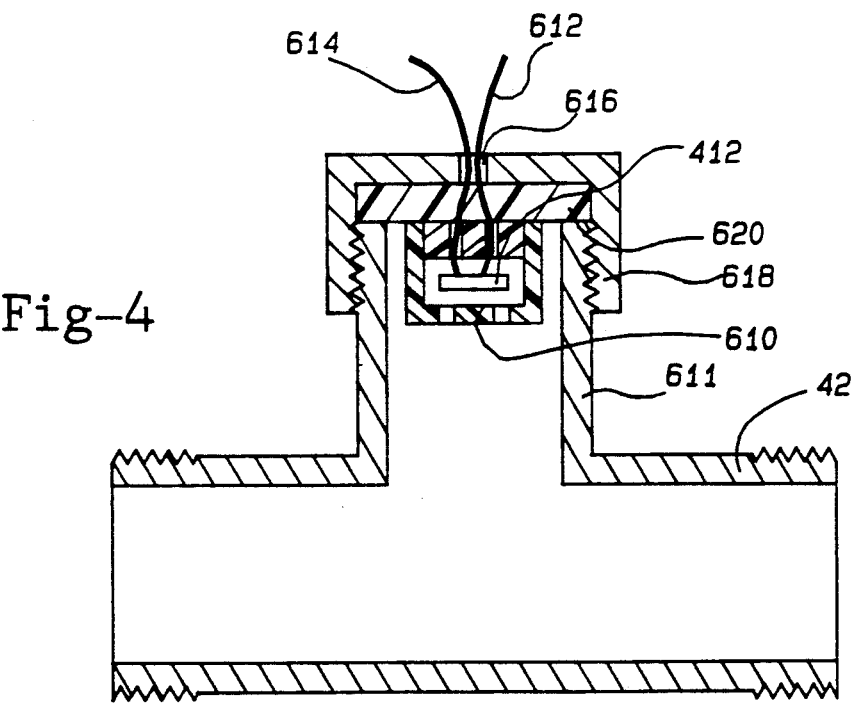
FIG. 4 is an illustration of the manner of installation of a piezo crystal in the air brake system.
Figure 3:
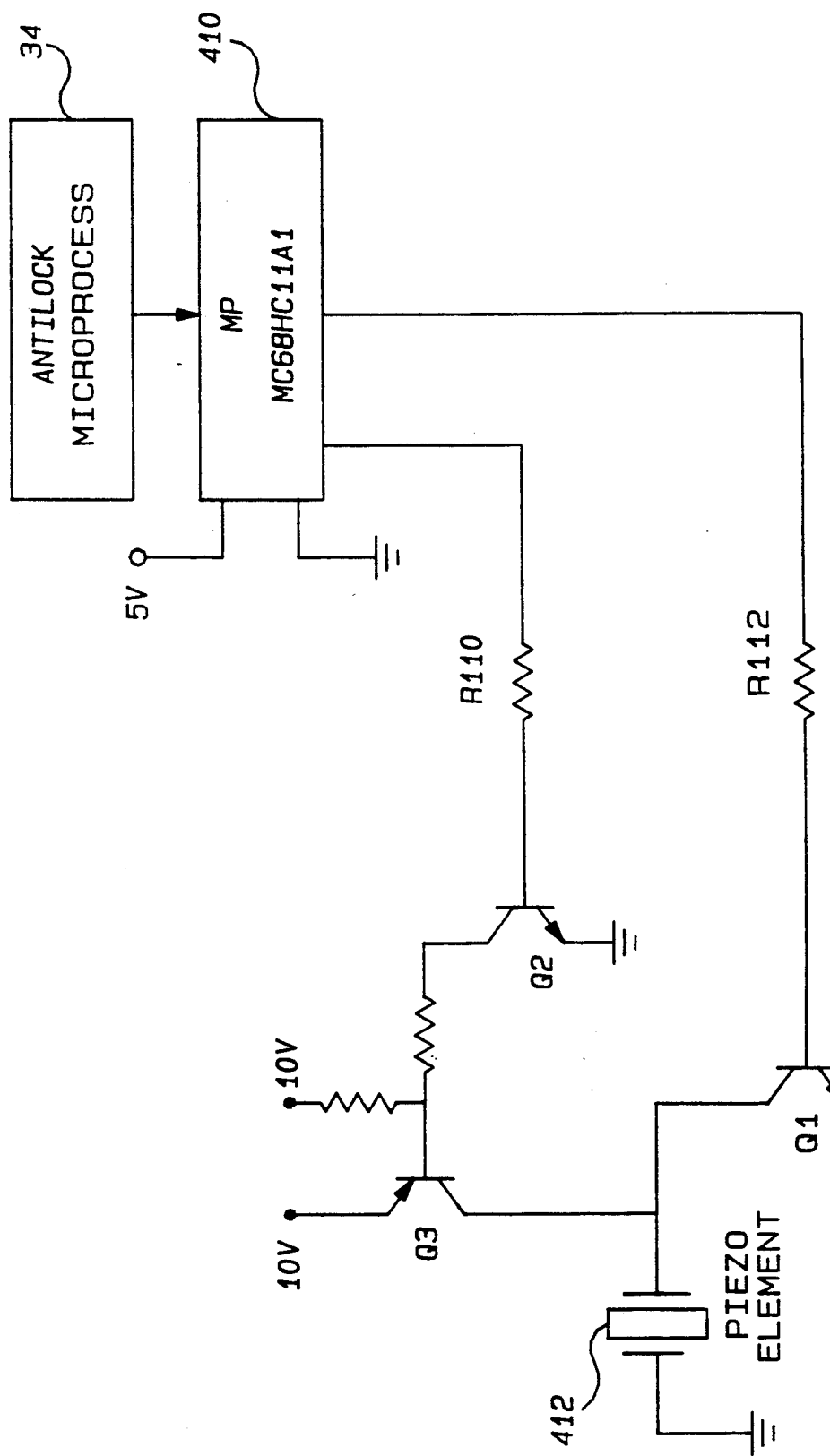
FIG. 3 is an electrical wiring diagram of the acoustic transmitter the preferred embodiment of the present invention.

The foregoing is a schematic representation of the preferred embodiment of the present invention. FIGS. 3 and 4 provide a detailed circuit diagram of the components necessary to practice the present invention.

Trailer antilock microprocessor 34 incorporates a diagnostic rotine which produces a logic level one in the event of detection of a diagnostic fault. This logic level one becomes an input to a microcontroller unit (MCU) 410 shown in FIG. 3. The preferred MCU is a Motorola MC68HC 11A1. Upon receiving a logic level one input, MCU 410 produces two control outputs which respectively gate transistors Q1 and Q2. Q2 in turn gates transistor Q3 which provides a bias to piezo crystal 412. Transistor Q1 functions to switch the bias of Q3 at a rate of 2500 Hz thereby producing an acoustic output from piezo crystal 412. In this manner, piezo crystal 412 produces an acoustic signal until the diagnostic fault condition indicated by the logic level one is removed from MCU 410. Piezo crystal 412 is placed in air brake command line 25 connecting the tractor and trailer.

FIG. 4 illustrates a preferred technique for installing piezo crystal 412 in air brake supply line 42. The crystal itself is retained in position by housing 610 in a T'd fitting 611. Supply leads 612 and 614 pass through an aperture 616 in cap 618. Potting 620 provides an effective seal thereby containing brake system air.

Figure 5:
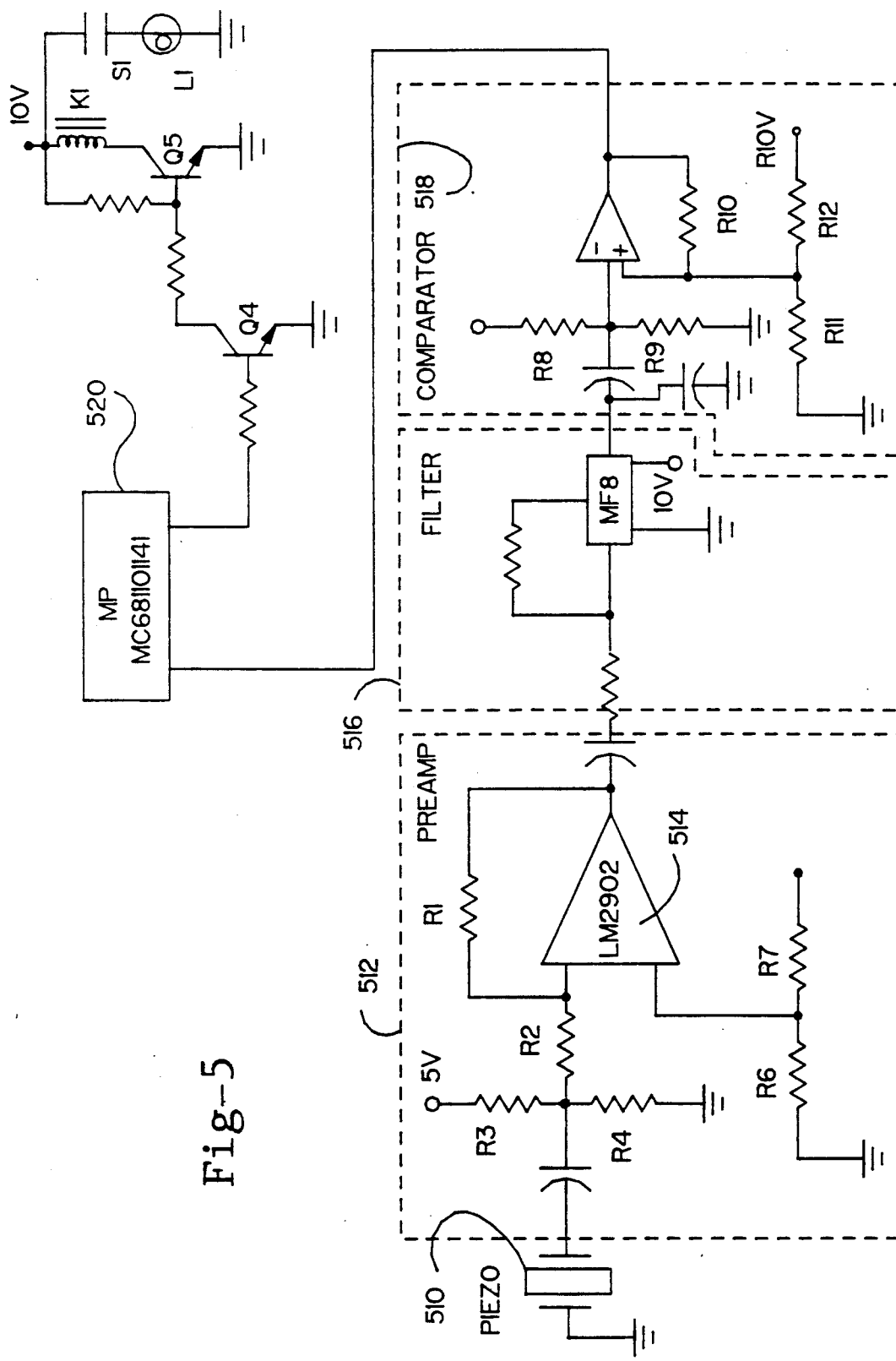
FIG. 5 is an electrical wiring diagram of the acoustic receiver of the preferred embodiment of the present invention.

The tractor incorporates a piezo crystal 510 in air brake command line 25 which receives the 2500 Hz acoustic signal produced by piezo crystal 412 and converts the signal to an electrical frequency signal which is then supplied to preamp 512 (as shown in FIG. 5). Preamp 512 consists of Op Amp 514. The preferred Op Amp is a National Semiconductor LM2902. Gain control of Op Amp 514 is controlled by resistors R1 and R2. Resistors R3 and R4 provide bias input and resistors R6 and R7 provide a reference bias. The output of preamp 512 is then provided to frequency selective filter 516. The preferred frequency selective filter is a National Semiconductor MF8. Filter 516 has a very narrow band width passing only 2500±25 Hz signals. Comparator 518 is a National Semiconductor Op Amp LM2902. Resistors R8 and R9 provide bias input. Resistor R10, R11 and R12 provide reference bias. The output of the comparator is a 2500 Hz squarewave which is supplied to an input terminal of microcontroller unit (MCU) 520. MCU 520 is preferably a Motorola MC68HC11A1. MCU 520 serves as a second level filter discriminating the 2500 Hz squarewave signal. Upon detection of a 2500 Hz signal, MCU 520 produces a logic level one output which is provided to gate transistor Q4 whose output is then supplied to gate transistor Q5. Upon gating transistor Q5, relay K1 is energized thereby latching switch S1 and illuminating lamp L1. Lamp L1 is displayed on the dashboard of the cab of the vehicle providing indication that a diagnostic fault condition exists in the antilock brake system of the trailer.

One skilled in the art will readily recognize that certain specific details shown in the foregoing specification and drawings are exemplary in nature and subject to modification without departing from the teachings of the disclosure. For example, the system may be operated in a manner to exchange data from tractor to trailer (and vice versa) in simplex, half duplex or full duplex. Multiplex is possible if multiple carrier frequencies are used. To increase the data transmission capability, the carrier can be keyed or modulated by various known data transmission techniques including:
 frequency shift keyed carrier,
 amplitude modulation, etc.

Various modifications of the invention discussed in the foregoing description will become apparent to those skilled in the art. All such variations that basically rely on the teachings through which the invention has advanced the art are properly considered within the sprit and scope of the invention.

I claim:

1. An apparatus for communicating trailer antilock system diagnostic status to a tractor operator through an existing air brake line comprising:
 means for generating and transmitting an acoustic signal in said air brake line in a trailer in response to a predefined diagnostic status of said antilock system;
 means for receiving said acoustic signal disposed on said air brake line on a tractor; and
 means for displaying receipt of said signal in direct view of said tractor operator.

2. An apparatus in claim 1 wherein said means for generating comprises a frequency source and a piezo crystal.

3. An apparatus as in claim 1 wherein said means for receiving comprises a piezo crystal.

4. An apparatus as in claim 1 wherein said means for displaying receipt of said signal comprises a light displayed on a dashboard of said tractor.

5. An antilock brake system for a tractor-trailer comprising:
 a microprocessor for controlling an antilock function of a trailer;
 a relay valve for modulating trailer brake force in response to control by said microprocessor;
 a diagnostic means for producing a signal in response to verification of preselected performance parameters of said microprocessor;

means for generating an acoustic signal in an air brake line in said trailer in response to lack of verification of preselected performance parameters;

means for receiving said acoustic signal in said air brake line on a tractor; and means for displaying receipt of said acoustic signal in direct view of a vehicle operator.

6. An apparatus as in claim 5 wherein said means for generating comprises a frequency source and a piezo crystal.

7. An apparatus as in claim 5 wherein said means for receiving comprises a piezo crystal.

8. An apparatus as in claim 5 wherein said means for displaying receipt of said signal comprises a light displayed on a dashboard in said tractor.

9. An apparatus for communicating a trailer antilock system status to a tractor through existing air brake lines comprising:

a voltage to frequency convertor for providing a frequency signal in response to a preselected trailer antilock system status;

a first piezo crystal disposed in an air brake line of a trailer and connected to a frequency convertor;

a second piezo crystal disposed in said air brake line on said tractor;

a frequency to voltage convertor connected to said second piezo crystal; and a warning indicator connected to said frequency to voltage convertor and positioned to provide notification of trailer antilock system status to an operator of said tractor.

10. An apparatus as in claim 9 wherein said warning indicator is a light which is latched on upon receiving an initial signal to provide a continuous uninterrupted display.

11. A method of continuously providing trailer antilock system diagnostic status to a tractor operator operating a tractor-trailer combination comprising the steps of:

receiving a first signal from a trailer antilock system in response to said antilock system providing indication of a predefined diagnostic status;

generating an acoustic signal in response to receipt of said first signal;

transmitting said acoustic signal through air lines of said tractor-trailer;

receiving said acoustic signal at a tractor;

converting said acoustic signal to a voltage signal; and displaying said voltage signal to provide notification of trailer antilock system status to said tractor operator.

* * * * *